(12) United States Patent
Kondo

(10) Patent No.: US 7,412,964 B2
(45) Date of Patent: Aug. 19, 2008

(54) MOTOR ACTUATOR AND TANDEM VALVE TYPE THROTTLE BODY USING THE SAME

(75) Inventor: Yasushi Kondo, Kawasaki (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/492,891

(22) Filed: Jul. 26, 2006

(65) Prior Publication Data
US 2007/0023008 A1  Feb. 1, 2007

(30) Foreign Application Priority Data
Jul. 26, 2005  (JP) .............................. 2005-215770
Jul. 26, 2005  (JP) .............................. 2005-215771

(51) Int. Cl.
*F02D 11/10*  (2006.01)
*H02K 7/116*  (2006.01)

(52) U.S. Cl. .......................... 123/336; 123/399; 310/83

(58) Field of Classification Search ................. 123/336, 123/337, 399, 403; 251/305, 306, 307, 308, 251/129.11, 129.12
See application file for complete search history.

(56) References Cited

U.S. PATENT DOCUMENTS 5,669,843 A * 9/1997 Bolton et al. ............... 475/149
6,912,994 B2 * 7/2005 Ozeki et al. ................. 123/399
6,923,157 B2 * 8/2005 Torii et al. .................. 123/337

FOREIGN PATENT DOCUMENTS

JP  2003-083171  3/2003

* cited by examiner

*Primary Examiner*—Willis R. Wolfe, Jr.
*Assistant Examiner*—Johnny H. Hoang
(74) *Attorney, Agent, or Firm*—Bacon & Thomas, PLLC

(57) ABSTRACT

To make compact a motor actuator and a tandem valve type throttle body preferably for two-wheeled vehicles, a gear portion (G) and a motor (M) are arranged in an actuator case constituted by a gear case (2) and a motor case (1), the gear portion (G) is formed by a motor gear (G1), an intermediate gear (G2) consisting of a small-diameter gear (G22) and a large-diameter gear (G21) in parallel, and an output gear (G3), the motor (M) protrudes into the gear case (2) and is near the large-diameter gear (G21), an actuator support boss (6a) of a throttle body (6) is inserted into a throttle body insertion hole (1d) a protruding end portion (9a) of an auxiliary throttle valve shaft (9) is inserted into a connection hole (G3a), and a mounting boss (5) is screwed to the throttle body (6) via a mounting hole (4).

1 Claim, 5 Drawing Sheets

MOTOR ACTUATOR AND TANDEM VALVE TYPE THROTTLE BODY USING THE SAME

BACKGROUND OF THE INVENTION

1. Field of the Invention

The present invention relates to a motor actuator structured such that an actuator case is formed by a motor case and a gear case, a motor and a gear portion are arranged in an inner side of the actuator case, a rotation of the motor is decelerated by the gear portion, and the decelerated motor rotation is output to an external portion via an output gear, and the motor actuator mentioned above is independently formed and is attached to various equipment. Accordingly, a rotating member provided in the various equipment is rotationally controlled by the motor of the motor actuator. Further, the present invention relates to a throttle body controlling an amount of air flowing for an engine, and more particularly to a tandem type throttle body in which a main throttle valve mechanically operated by an accelerator so as to be opened and closed is arranged within an intake passage provided so as to pass through the throttle body, and an auxiliary throttle valve electrically operated by a motor so as to be opened and closed is arranged within the intake passage in an upstream side from the main throttle valve.

2. Description of the Conventional Art

A first example of a conventional motor actuator is shown in FIG. 4. Reference numeral 30 denotes a motor case in which a motor M is arranged so as to be accommodated in an inner portion. A motor accommodating concave portion 30b is provided in a concave manner toward a right open end 30a in the drawing. Further, the motor M constituted by a step motor or the like provided with an output shaft Ma is arranged so as to be inserted in to the motor accommodating concave portion 30b. Reference numeral 31 denotes a gear case in which a gear portion G is arranged so as to be accommodated in an inner portion. A gear accommodating concave portion 31b is provided in a concave manner toward a left open end 31a in the drawing. Further, the open end 30a of the motor case 30 is brought into contact with the open end 31a of the gear case 31, whereby the actuator case K is formed. Accordingly, the motor and the gear portion G are arranged so as to be accommodated in an inner portion of the actuator K. Further, the gear portion is constituted by a motor gear G1, an intermediate gear G2 rotatably borne to the support shaft 32, and an output gear G3 in which a rotation transmission hole G3a is provided. The motor gear G1 is connected to an output shaft Ma of the motor M and is arranged so as to be engaged with one side of the intermediate gear G2. Further, the other side of the intermediate gear G2 is arranged so as to be engaged with the output gear G3. Further, a mounting boss 33 in which a mounting hole 33a is provided is integrally formed in the open end 30a of the motor case 30, and a mounting boss 34 in which a mounting hole 34a is provided is integrally formed in the open end 31a of the gear case 31. Since the motor case 30 and the gear case 31 are arranged so as to be brought into contact with each other by the mutual open ends 30a and 31a, a mounting boss 36 (formed by the mounting bosses 33 and 34) having a mounting hole 35 (formed by the mounting holes 33a and 34a) is formed in a part of the actuator case K. In accordance with the structure mentioned above, a motor actuator provided with the gear portion G and the motor M is formed in an inner portion of the actuator case K. The motor actuator mentioned above is structured such that an end surface of the boss 36 is arranged so as to be brought into contact with an equipment E, a bolt T is inserted into the mounting hole 35 under the state mentioned above, and the mounting boss 36 is screwed and fixed to the equipment E by the bolt T. On the other hand, one end of a rotating shaft Wa provided in the equipment E is arranged so as to be inserted to the rotation transmission hole G3a of the output gear G3, the insertion is executed by forming a cross sectional shape of the rotation transmission hole G3a in a segmental shape hole and forming a cross sectional shape of the rotating shaft Wa in a segmental shape, and the rotation of the output gear G3 is transmitted to the rotating shaft Wa. In accordance with the structure mentioned above, the rotation of the motor M is decelerated by the gear portion G, the decelerated rotation is transmitted to the rotating shaft Wa via the output gear G3, and it is possible to rotationally control the rotating shaft Wa of the equipment E in correspondence to the rotation of the motor M.

A second example of the conventional motor actuator is shown in FIG. 5. Reference numeral 40 denotes a case in which the motor M and the gear portion G are arranged so as to be accommodated in an inner portion. An accommodating concave portion 40b is provided in a concave manner toward a right open end 40a. Further, the motor M constituted by the step motor or the like provided with the output shaft Ma is arranged and the gear portion G is arranged within the accommodating concave portion 40b. The gear portion G is constituted by the motor gear G1, the intermediate gear G2 rotatably borne to the support shaft 41, and the output gear G3 in which the rotation transmission hole G3a is provided. In the intermediate gear G2 among them, a large-diameter gear G2a and a small-diameter gear G2b are formed in two stages in a longitudinal axial direction of the support shaft 41. Accordingly, the motor gear G1 is engaged with the large-diameter gear G2a of the intermediate gear G2, and the small-diameter gear G2b of the intermediate gear G2 is engaged with the output gear G3. Further, a cover 42 is arranged so as to be brought into contact with the open end 40a of the case 40 and the open end 40a of the case 40 is closed, whereby the actuator case K is formed. Accordingly, the motor and the gear portion G are arranged so as to be accommodated within the closed accommodating space of the actuator K. Further, a mounting boss 43 in which a mounting hole 43a is provided is integrally formed in the open end 40a of the case 40, and a mounting boss 44 in which a mounting hole 44a is provided is integrally formed in the open end 42a of the cover 42. Since the case 40 and the cover 42 are arranged so as to be brought into contact with each other by the mutual open ends 40a and 42a, a mounting boss 46 (formed by the mounting bosses 43 and 44) having a mounting hole 45 (formed by the mounting holes 43a and 44a) is formed in a part of the actuator case K. In accordance with the structure mentioned above, a motor actuator provided with the gear portion G and the motor M is formed in an inner portion of the actuator case K. The motor actuator mentioned above is structured such that an end surface of the mounting boss 46 is arranged so as to be brought into contact with the equipment E, the bolt T is inserted into the mounting hole 45 under the state mentioned above, and the mounting boss 46 is screwed and fixed to the equipment E by the bolt T. On the other hand, one end of the rotating shaft Wa is arranged so as to be inserted into the rotation transmission hole G3a of the output gear G3 in the same manner as mentioned above. In accordance with the structure mentioned above, the rotation of the motor M is decelerated by the gear portion G, the decelerated rotation is transmitted to the rotating shaft Wa via the output gear G3, and it is possible to rotationally control the rotating shaft Wa in correspondence to the rotation of the motor M.

The conventional tandem valve type throttle body is disclosed in Japanese Unexamined Patent Publication No. 2003-

83171 filed by the applicant of the present invention. In the tandem valve type throttle body mentioned above, an intake passage is provided so as to pass through the throttle body, and a main throttle valve is attached to a main throttle valve shaft which is rotationally operated mechanically by a vehicle driven, whereby the intake passage is opened and closed. Further, in the intake passage in an upstream side from the main throttle valve, an auxiliary throttle valve is attached to an auxiliary throttle valve shaft which is rotationally operated electrically by a motor, and the intake passage in the upstream side from the main throttle valve is electrically opened and closed by the auxiliary throttle valve. On the other hand, the motor actuator is structured such that the actuator case is formed by the gear case and the motor case, the motor and gear are arranged within the actuator case, the rotation of the motor is decelerated by the gear and the auxiliary throttle valve shaft is rotationally operated by the output gear, whereby the auxiliary throttle valve electrically controls the intake passage in the upstream side from the main throttle valve so as to open and close.

SUMMARY OF THE INVENTION

Problem to be Solved by the Invention

In accordance with the first example of the conventional motor actuator, the following problems are generated. In recent years, in accordance with an improvement of an injection molding technique using a synthetic resin material, the gear is formed by a synthetic resin material, and the motor gear G1, the intermediate gear G2 and the output gear G3 constituting the gear portion G are formed by the synthetic resin material. In this case, comparing a weight Gw of the gear portion G with a weight Mw of the motor M, the weight Mw of the motor M is formed heavier than the weight Gw of the gear portion G. Further, the motor M having the great weight is accommodated within the motor accommodating concave portion 30b, and is arranged so as to largely protrude to a left side from the open end 30a of the motor case 30. On the other hand, the mounting boss 36 for attaching the motor actuator to the equipment E is formed in the open end 30a of the motor case 30 and the open end 31a of the gear case 31.

In accordance with the structure mentioned above, the following problems are generated.

(1) When attaching and fixing the motor actuator to the equipment E, a great offset load generated by the motor M is applied to the mounting boss 36, and a great bending moment is applied to the mounting boss 36. In order to cope with this, it is necessary to increase a rigidity of the mounting boss 36 and enlarge the mounting boss 36 in size. Accordingly, the weight of the motor actuator is increased, and it is impossible to arrange the motor actuator compact. This generates a great problem at a time of attaching the motor actuator to a juddering equipment.

(2) The motor M is inserted to the motor case 30 in a light pressure inserted state, however, the motor M is entirely inserted into the motor accommodating concave portion 30b from the open end 30a of the motor case 30. Accordingly, it is impossible to improve inserting workability of the motor M. This is because it is impossible to grip an outer periphery of the motor M by a jig or the like until the end at a time of inserting the motor M into the motor accommodating concave portion 30b.

In accordance with the second example of the conventional motor actuator, the following problems are generated.

(1) The entire of the motor M and the gear portion G is arranged within the case 40. In accordance with this structure, when fixing the motor actuator to the equipment E via the mounting boss 46, the particularly great offset load is applied to the mounting boss 46 by the motor M and the gear portion G, and a great bending moment is applied to the mounting boss 46. In accordance with the structure mentioned above, it is necessary to enlarge the mounting boss 46 in size in the same manner as the prior art mentioned above, and it is impossible to make the motor actuator light and compact.

(2) The right end surface M1 of the motor M is arranged so as to face to a portion near a right end of the small-diameter gear G2b formed in two stages in a longitudinal axial direction X-X of the support shaft 41. In accordance with this structure, it is necessary to set a length L in the longitudinal direction of the output shaft Ma of the motor M and the gear portion G2 large, and it is impossible to make the motor actuator compact. This is because the gear width G2w of the intermediate gear G2 and the width Mw of the motor M are necessary.

(3) When inserting the motor M into the accommodating concave portion 40b of the case 40, the entire of the outer periphery of the motor M is inserted into the accommodating concave portion 40b. Accordingly, it is impossible to grip the outer periphery of the motor M by the jig or the like until the end, and it is impossible to improve inserting workability of the motor M into the case 40.

Further, in accordance with the tandem valve type throttle body described in Japanese Unexamined Patent Publication No. 2003-83171, as shown in FIG. 2 of the publication mentioned above, a motor is arranged so as to be accommodated within a motor case, gears are arranged so as to be accommodated within a gear case, the motor case and the gear case are brought into contact with each other in open ends thereof, whereby an actuator case is formed, and the motor and the gear portion are arranged so as to be accommodated within the actuator case, whereby a motor actuator is formed. Further, a throttle body insertion hole is provided in a left side end of the gear case, and an actuator support boss formed so as to protrude to a right side from the throttle body is arranged so as to be inserted into the throttle body insertion hole, whereby the motor actuator is attached to the throttle body, and an output gear is connected to an end portion of an auxiliary throttle valve shaft. In this case, when the motor is rotated, a rotation of the motor is transmitted to an output gear from a motor gear attached to an output shaft of the motor, the rotation is decelerated, and the decelerated rotation is transmitted to an auxiliary throttle valve shaft from the output gear so as to rotate the auxiliary throttle valve shaft at the decelerated speed in correspondence to the rotation of the motor, whereby it is possible to control an opening degree of the auxiliary throttle valve to a proper opening degree by the motor. (In the structure mentioned above, the right and left are referred in FIG. 2, and names are replaced by new names.) In accordance with the conventional tandem valve type throttle body mentioned above, the throttle body insertion hole is provided in a left end of the gear case, and the gear and the motor are arranged toward a right side from the throttle body insertion hole. In accordance with the structure mentioned above, since the heavy motor is arranged in the right side of the comparatively light formed gear portion, a center of gravity of the entire of the motor actuator is positioned greatly rightward away from the throttle body insertion hole, and a great bending moment in a clockwise direction in FIG. 2 of the publication mentioned above is applied to the throttle body insertion hole of the gear case. Accordingly, a lot of development man-hours such as a vibration resistance test and the like is required for setting a thickness, a strength and an axial length of the throttle body insertion hole portion.

Further, in accordance with the structure mentioned above, the motor including the gear protrudes greatly to a right direction from the side wall of the throttle body, thereby particularly deteriorating a freedom of being mounted on a two-wheeled vehicle in which the throttle body is arranged so as to be directly exposed, and a rider gets on the vehicle astride. Further, when employing the motor actuator in accordance with a tandem valve type multiple throttle body in which a plurality of throttle bodies are arranged in the side portion, the motor actuator is connected to the auxiliary throttle valve shaft of the outermost throttle body constituting the multiple throttle body. In accordance with this structure, the rotation of the output gear of the motor actuator is directly transmitted only to the outermost auxiliary throttle valve, and all the auxiliary throttle valve shafts in the other throttle bodies are indirectly rotated. Further, there is generated a problem that an entire width of the multiple throttle body is increased.

The motor actuator in accordance with the present invention is made by taking the problems mentioned above into consideration, and a main object of the present invention is to provide a motor actuator which can decelerate a rotation of a motor in two stages, and has a high vibration resistance, a reduced weight and a compact structure, by reducing an application of an offset load to a mounting boss formed in open ends of a motor case and a gear case, particularly from the motor case side. Further, a tandem valve type throttle body in accordance with the present invention is made by taking the problems mentioned above into consideration, and a main object of the present invention is to provide a tandem valve type throttle body structured such that a gear case in which a gear portion is accommodated in an inner portion, and a motor case in which a motor is accommodated are connected in open ends thereof, whereby a motor actuator is formed, and the motor actuator is inserted and supported to a throttle body via a throttle body insertion hole provided in the case, wherein application of a bending moment particularly by the motor to the throttle body insertion hole of the motor actuator is reduced and vibration resistance is enhanced, and to provide a tandem valve type throttle body which can shorten a side length of the throttle body in a longitudinal direction of the auxiliary throttle valve shaft, and has an excellent mounting property particularly on the two-wheeled vehicle. Further, the other object of the present invention is to provide a tandem valve type multiple throttle body provided with a preferable motor actuator installed to the multiple throttle body in which a plurality of throttle bodies are arranged in a side portion.

Means for Solving the Problem

In order to achieve the objects mentioned above, in accordance with a first aspect of the present invention, there is provided a motor actuator structured such that a motor and a gear portion are arranged so as to be accommodated within an actuator case formed by a motor case and a gear case, and a rotation of the motor is decelerated by the gear portion and is output toward an external portion via an output gear, wherein a gear accommodating concave portion is provided in a concave manner from an open end at a right side toward a bottom portion in the gear case, the gear portion arranged within the gear accommodating concave portion is formed by a motor gear connected to an output shaft of the motor, an intermediate gear, which is connected to a support shaft and has the structure that a small-diameter gear and a large-diameter gear are formed in two stages along a longitudinal direction of the support shaft in parallel, the small-diameter gear is arranged at the open end side of the gear case and the large-diameter gear is arranged at the bottom portion side of the gear accommodating concave portion, and an output gear outputting the rotation toward the external portion, a motor accommodating concave portion provided in a concave manner toward a left side open end in the motor case, which is arranged so as to be brought into contact with the open end of said gear case, a left side surface of the motor arranged within the motor accommodating concave portion of the motor case is arranged so as to protrude to an inner side of the gear accommodating concave portion of the gear case from the open end of the motor case and be close to a side surface of an open end side of the large-diameter gear within the gear accommodating portion, and a mounting boss having a mounting hole is provided continuously with the open end of the gear case and a mounting boss having a mounting hole is provided continuously with the open end of the motor case.

In order to achieve the object mentioned above, in accordance with a second aspect of the present invention, there is provided a tandem valve type throttle body, wherein a throttle body insertion hole is provided in the motor case of the motor actuator toward a side surface in an opposite side from the open end of the motor case so as to face to the output gear, and an intake passage passing through the throttle body is provided with a main throttle valve attached to a mechanically operated main throttle valve shaft, and an auxiliary throttle valve attached to an auxiliary throttle valve shaft electrically operated by the motor in the intake passage in an upstream side from the main throttle valve, an actuator support boss formed so as to protrude to one side of the throttle body while surrounding an outer periphery of the auxiliary throttle valve shaft is inserted into the throttle body insertion hole provided in the motor case, a protruding end portion of the auxiliary throttle valve shaft is arranged so as to be connected to a connection hole of the output gear, and a mounting boss formed in the case is screwed and fixed to the throttle body via a mounting hole.

In order to achieve the object mentioned above, in accordance with a third aspect of the present invention, there is provided a tandem valve type throttle body, wherein a first throttle body insertion hole is provided in the motor case of the motor actuator toward a side surface in an opposite side from the open end of the motor case so as to face to the output gear, a second throttle body insertion hole coaxial with the first throttle body insertion hole is provided in the gear case toward a side surface in an opposite side from the open end of the gear case so as to face to the output gear, intake passages passing through the throttle bodies are provided with main throttle valves attached to mechanically operated main throttle valve shafts, and auxiliary throttle valves attached to auxiliary throttle valve shafts electrically operated by the motor in the intake passages in upstream sides from the main throttle valves, a plurality of the throttle bodies are arranged adjacently sideward, auxiliary throttle valve shafts arranged in the respective throttle bodies are coaxially arranged, a first actuator support boss formed so as to surround an outer periphery of the one side auxiliary throttle valve shaft in the one side throttle body adjacently provided is inserted into the first throttle body insertion hole provided in the motor case, a second actuator support boss formed so as to surround an outer periphery of the other side auxiliary throttle valve shaft in the other side throttle body adjacently provided is inserted into the second throttle body insertion hole provided in the gear case, a protruding end portion of the one side auxiliary throttle valve shaft and a protruding end portion of the other side auxiliary throttle valve shaft are inserted and connected to a connection hole of the output gear, and a mounting boss formed in the case is screwed and fixed to the throttle bodies via a mounting hole.

Effect of the Invention

In accordance with the first aspect of the present invention, the gear portion is formed by the motor gear connected to the output shaft of the motor, the intermediate gear in which the small-diameter gear and the large-diameter gear are formed in two stages along the longitudinal direction of the support shaft, and the output gear outputting the rotation toward the external portion. In accordance with the structure mentioned above, the rotation of the motor is decelerated in the first stage by the motor gear and the large-diameter gear of the intermediate gear, and is decelerated in the second stage by the small-diameter gear of the intermediate gear and the output gear. Therefore, it is possible to largely decelerate the rotation of the motor, and it is possible to widen a deceleration use range as the motor actuator. Further, in the case that the motor arranged within the motor accommodating concave portion of the motor case is arranged so as to protrude to the inner side of the gear case from the open end of the motor case and be close to the side surface of the open end side of the large-diameter gear, it is possible to arrange the center of gravity of the motor close to the open end side of the motor case, whereby it is possible to reduce the bending moment caused by the offset load applied to the mounting boss formed in the actuator case, it is possible to enhance a vibration resistance of the motor actuator at a time of attaching the motor actuator to the equipment, it is possible to prevent an enlargement in size of the mounting boss and it is possible to make the motor actuator light and compact. Further, in accordance with the structure mentioned above, the length of the motor and the gear portion in the longitudinal direction of the output shaft is formed by the gear width of the large-diameter gear of the intermediate gear and the width of the motor, whereby it is possible to shorten an entire width of the actuator case and it is possible to make the motor actuator light and compact in addition to the matter mentioned above. As mentioned above, since it is possible to make the motor actuator light and compact, it is possible to largely improve freedom of arranging and mounting the motor actuator within the narrow space. Further, in the structure mentioned above, since the motor is arranged so as to protrude to the inner side of the gear case from the open end of the motor case, it is possible to grip the outer periphery of the motor by the jig or the like until the end of the insertion, at a time of inserting the motor to the motor accommodating concave portion of the motor case. Therefore, it is possible to improve insertion workability and it is possible to accurately insert it into the motor accommodating concave portion.

In accordance with the second aspect of the present invention, the motor gear, the intermediate gear and the output gear are arranged so as to be accommodated within the gear case, and the intermediate gear is structured such that the small-diameter gear and the large-diameter gear are formed in parallel in the two stages along the longitudinal direction of the support shaft, and the small-diameter gear is arranged in the open end side of the gear case. Further, the motor is arranged so as to be accommodated in the motor case, and a part of the motor is arranged so as to protrude from the open ed of the motor case. Further, the open end of the gear case and the open end of the motor case are brought into contact with each other so as to be formed as the motor actuator. At this time, a part of the motor arranged within the motor case is arranged so as to enter into the gear case and is arranged so as to be close to the side surface in the open end side of the large-diameter gear within the gear case. In accordance with the structure mentioned above, since it is possible to make the center of gravity of the motor accommodated within the motor case close to the open end side of the motor case, it is possible to largely reduce the bending moment by the motor applied to the throttle body insertion hole at a time of arranging so as to fit the throttle body insertion hole provided so as to be open to the open end of the motor case to the actuator support boss of the throttle body. In accordance with the structure mentioned above, it is possible to prevent enlargement of a thickness and a bearing length of the throttle body insertion hole portion of the motor case, and it is possible to achieve a weight saving and a compact structure of the tandem valve type throttle body. Further, as mentioned above, since it is possible to reduce the bending moment generated by the motor and applied to the throttle body insertion hole, it is possible to improve the vibration resistance of the motor actuator, and it is preferably employed particularly in the tandem valve type throttle body for a two-wheeled vehicle. Further, since the motor actuator is attached to the throttle body via the throttle body insertion hole provided in the motor case, the motor having a large constitution is arranged toward a center side of the intake passage of the throttle body, whereby it is possible to shorten the entire width of the throttle body along the longitudinal axial direction of the auxiliary throttle valve shaft. Further, in the intermediate gear, since the small-diameter gear and the large-diameter gear are formed in parallel in two stages along the longitudinal direction of the support shaft, the motor gear and the large-diameter gear are engaged, and the small-diameter gear and the output gear are engaged, the intermediate gear can decelerate the rotation of the motor gear in two stages so as to output toward the auxiliary throttle valve shaft from the output gear, whereby it is possible to improve a rotation controllability of the auxiliary throttle valve shaft by the motor. As mentioned above, since it is possible to reduce the bending moment generated by the motor and applied to the throttle body insertion hole of the motor case, it is possible to provide the tandem valve type throttle body which is particularly preferable in a two-wheeled vehicle, a three-wheeled buggy vehicle, an outboard motor or the like used under a severe environment of the vibration condition in comparison with a four-wheeled vehicle. Further, since it is possible to shorten the entire width of the throttle body in the longitudinal axial direction of the auxiliary valve shaft, it is possible to improve a mounting property to a two-wheeled vehicle in which the throttle body is arranged between both feet of the passenger.

In accordance with the third aspect of the present invention, in the same manner as the second aspect, the gear case provided with the gear portion in the inner portion and the motor case provided with the motor in the inner portion are arranged so as to be brought into contact with each other by the respective open ends, whereby the motor actuator is formed, the first throttle body insertion hole provided in the motor case is arranged so as to be inserted into the first actuator support boss of the adjacently provided one side throttle body, and the second throttle body insertion hole provided in the gear case is arranged so as to be inserted into the second actuator support boss of the adjacently provided other side throttle body, and the motor actuator is arranged between the adjacent throttle bodies. In accordance with the structure mentioned above, it is possible to reduce the application of the bending moment generated by the motor in the same manner as the second aspect mentioned above, with respect to the first throttle body insertion hole and the second throttle body insertion hole, and since the intermediate gear is formed in parallel in two stages by the large-diameter gear and the small-diameter gear, it is possible to achieve the same effect as the second aspect. Further, in addition to this, in the tandem valve type multiple throttle body in which a plurality of throttle bodies are arranged in the side portion, it is possible to particularly achieve the following effects. A part of the motor arranged so as to be accommodated in the motor case is arranged so as to protrude to the inner side of the gear case from the open end of the motor case and be close to the side surface of the open end side of the large-diameter gear, it is possible to make the motor close to the open end of the motor case, and it is possible to make the distance between the right end face of the motor and the left end face of the large-diameter gear small in the longitudinal axial direction of the output shaft of the motor. Accordingly, it is possible to shorten a pitch between the intake passages of the adjacent throttle bodies, whereby it is possible to shorten the entire width of the tandem valve type multiple throttle body in the longitudinal axial direction of the auxiliary throttle valve shaft. Further, the rotation of the motor of the motor actuator is directly transmitted toward the protruding end portion of the one side auxiliary throttle valve shaft of the one side throttle body via the output gear, and is directly transmitted toward the protruding end portion of the other side auxiliary throttle valve shaft of the other side throttle body. In accordance with the structure mentioned above, it is possible to securely control the one side auxiliary throttle valve shaft and the other side auxiliary throttle valve shaft by the output gear. Further, since the first actuator support boss of the one side throttle body is inserted into the first throttle body insertion hole of the motor case constituting the motor actuator, and the second actuator support boss of the other side throttle body is inserted into the second throttle body insertion hole of the gear case, the gear case and the motor case are supported by the actuator support bosses of the respective throttle bodies facing to the gear case and the motor case, in the respective side portions of the contact surfaces of both the cases. Accordingly, it is possible to more stably and securely attach the motor actuator to the throttle body.

DETAILED DESCRIPTION OF PREFERRED EMBODIMENT

Embodiment 1

Figure 1:
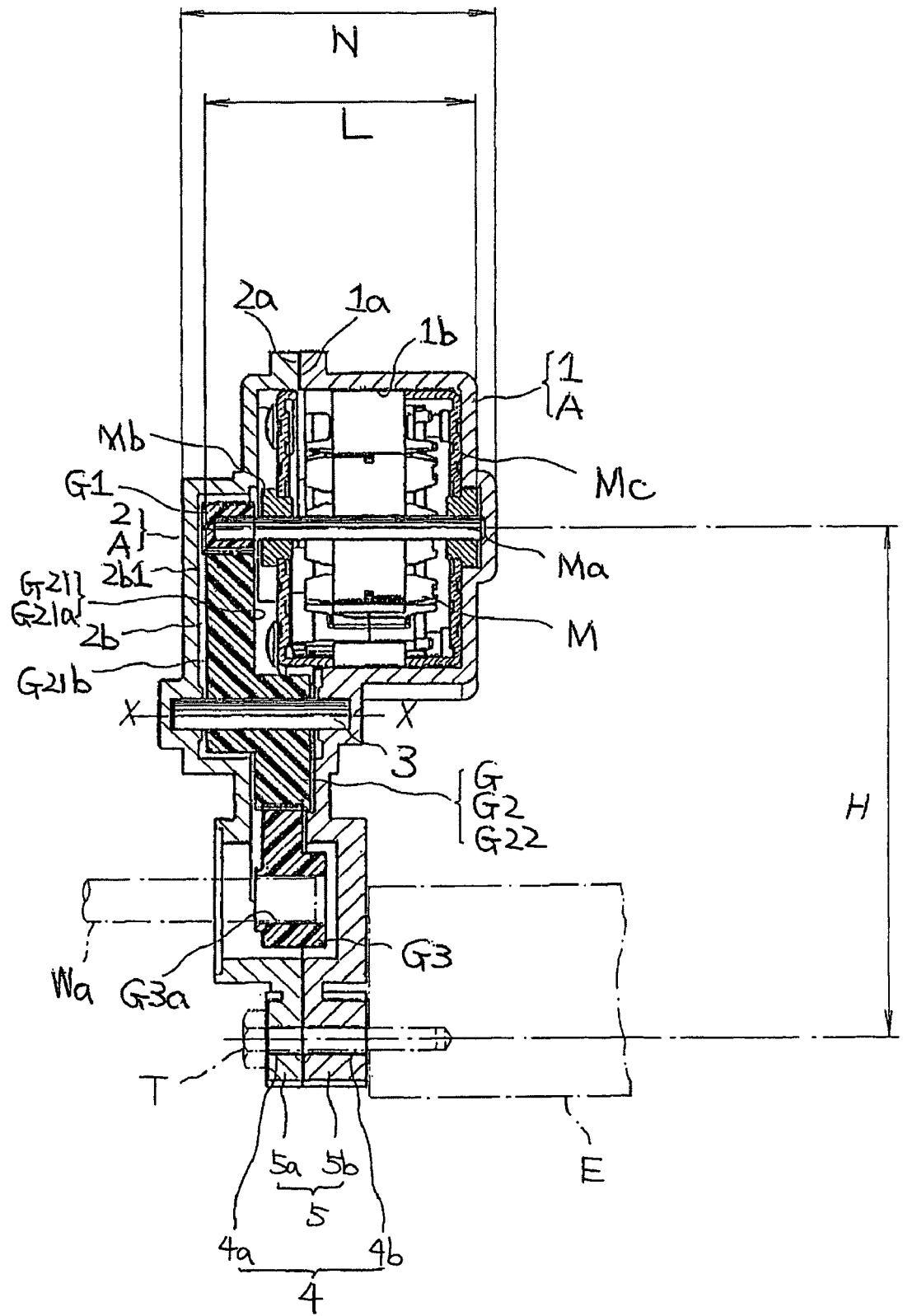
FIG. 1 is a vertical sectional view showing an embodiment of a motor actuator in accordance with the present invention.

A description will be given below of an embodiment of a motor actuator in accordance with the present invention with reference to FIG. 1. Reference numeral 1 denotes a motor case in which a motor M is arranged so as to be accommodated in an inner portion, and reference numeral 2 denotes a gear case in which a gear portion G is arranged so as to be accommodated in an inner portion. An open end 1a of the motor case 1 and an open end 2a of the gear case 2 are arranged so as to be brought into contact with each other, whereby an actuator A provided with an accommodating space is formed. In a gear accommodating concave portion 2b provided in a concave manner in the gear case 2, there is arranged the gear portion G constituted by a motor gear G1 connected to a protruding end of an output shaft Ma of the motor M and having a smallest diameter, an intermediate gear G2 rotatably borne to a support shaft 3, and an output gear G3 provided with a rotation transmission hole G3a having a segmental circular cross sectional shape. The intermediate gear G2 among them is structured such that a large-diameter gear G21 and a small-diameter gear G22 are formed in parallel in two stages along a longitudinal direction X-X of the support shaft 3. In this case, particularly, the small-diameter gear G22 of the intermediate gear is arranged in the open end 2a side of the gear case 2 (a right side of the gear case 2), and the large-diameter gear G21 is arranged in a bottom portion 2b1 side of the gear accommodating concave portion 2b (a left side of the gear case 2). In accordance with the gear portion G structured as mentioned above, a primary deceleration is achieved by the engagement between the motor gear G1 and the large-diameter gear G21 of the intermediate gear G2, and a secondary deceleration is achieved by the engagement between the small-diameter gear G22 of the intermediate gear G2 and the output gear G3.

A motor M such as a step motor or the like is arranged in a light pressure inserted state so as to be inserted into the motor accommodating concave portion 1b of the motor case 1. At this time, a left side surface Mb of the motor M is firstly arranged so as to protrude toward an inner side of the gear accommodating concave portion 2b of the gear case 2 from the open end 1a of the motor case 1, and the left side surface Mb of the motor M is secondly arranged so as to be close to a side surface G21a (corresponding to a right side surface of the large-diameter gear G21 in FIG. 1) in the open end side of the large-diameter gear G21 forming the intermediate gear G2.

Further, a mounting boss 5a provided with a mounting hole 4a is integrally formed in an outer side surface in the open end 2a side of the gear case 2, and a mounting boss 5b provided with a mounting hole 4b is integrally formed in an outer side surface of the open end 1a side of the motor case 1. The open end 2a of the gear case 2 and the open end 1a of the motor case 1 are arranged so as to be brought into contact with each other, whereby a mounting boss 5 (formed by the mounting bosses 5a and 5b) provided with the mounting hole 4 (formed by the mounting holes 4a and 4b) is formed through the gear case 2 and the motor case 1.

Further, as mentioned above, the motor actuator formed by arranging the motor M and the gear portion G within the actuator case A is screwed and fixed to an equipment E via the mounting boss 5 by inserting a bolt T into the mounting hole 4 and screwing the bolt T toward a female thread hole Wb provided in the equipment E. On the other hand, a rotating shaft Wa in an outer portion is arranged so as to be inserted into a rotation transmission hole G3a of the output gear G3, and rotates synchronously with the output gear G3.

In accordance with the motor actuator on the basis of the present invention structured as mentioned above, when the output shaft Ma is rotated on the basis of the driving of the motor M, the rotation is decelerated in the first stage by the motor gear G1 and the large-diameter gear G21 of the intermediate gear G2, and is further decelerated in the second stage by the small-diameter gear G22 of the intermediate gear G2 and the output gear G3, and the rotating force of the output gear G3 decelerated in two stages is output toward the external portion via the rotating shaft Wa. In accordance with the structure mentioned above, it is possible to decelerate in two stages desirably by the gear portion G, and it is possible to increase an allowable width of a decelerating range. Further, since the intermediate gear G2 is formed in two stages by the large-diameter gear G21 and the small-diameter gear G22 in parallel, in the longitudinal direction X-X of the support shaft 3, it is possible to limit a diametrical length of the gear to be small even in the case of executing the two-stage deceleration mentioned above, and it is possible to make the motor actuator compact. Further, in accordance with the two-stage deceleration mentioned above, it is possible to prevent enlargement of a distance H between the output shaft Ma of the motor M and the bolt T inserted into the mounting hole 4, and it is possible to decrease a moment of rotation applied to the mounting boss 5 by the motor M. On the other hand, since the left side face Mb of the motor M arranged so as to be inserted into the motor accommodating concave portion 1b of the motor case 1 is arranged so as to protrude toward the inner side of the gear accommodating concave portion 2b from the open end 1a of the motor case 1, and is arranged so as to be close to the side surface G21a in the open end side of the large-diameter gear G21 of the intermediate gear G2, it is possible to move the center of gravity of the motor M toward the open end 1a of the motor case 1 (to a left side in the drawing), whereby it is possible to reduce the application of the offset load applied to the mounting boss 5, it is possible to reduce the bending moment generated by the motor M, it is possible to prevent enlargement in size of the mounting boss 5, and it is possible to achieve the reduction of weight and the compact structure of the motor actuator. Further, since the left side surface Mb of the motor M is arranged so as to be close to the side surface G21a in the open end side of the large-diameter gear G21, it is possible to make the length L between a right end surface Mc of the motor M in the longitudinal direction of the output shaft Ma of the motor M and the side surface G21b (corresponding to the left end surface) in the bottom portion side of the gear accommodating concave portion 2b of the large-diameter gear G21 to be small, even in the case of the intermediate gear G2 being formed in two stages by the small-diameter gear G22 and the large-diameter gear G21 in parallel, whereby it is possible to make an entire width N of the actuator case A small. Further, since the left side surface Mb of the motor M is arranged so as to protrude to the gear case 2 side from the open end 1a of the motor case 1, it is possible to grip the outer periphery of the motor M by the jig or the like until the completion of the insertion at a time of inserting the motor M into the motor accommodating concave portion 1b of the motor case 1. Accordingly, it is possible to securely and efficiently execute the inserting work of the motor M into the motor accommodating concave portion 1b.

Embodiment 2

Figure 2:
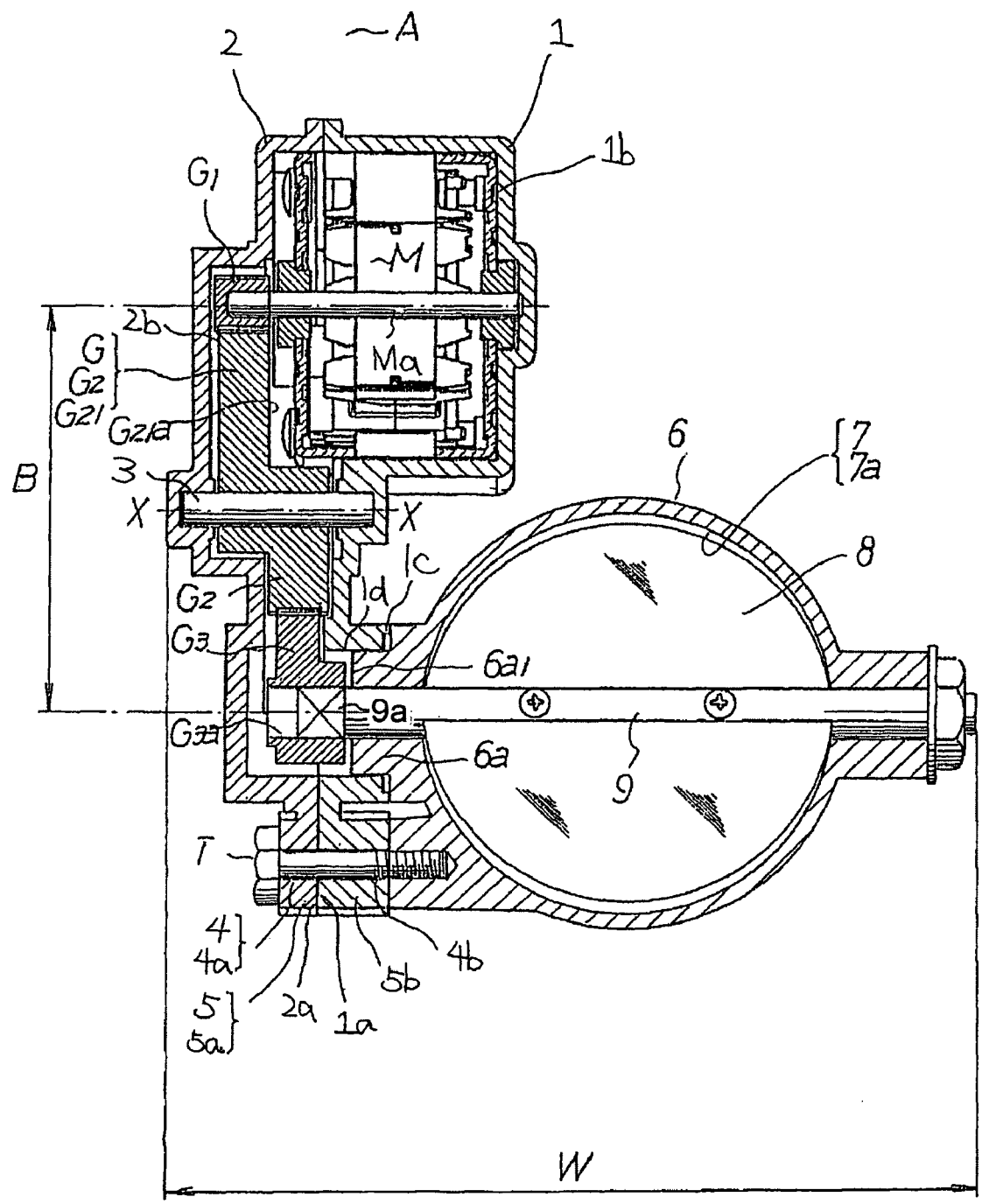
FIG. 2 is a vertical sectional view showing a first embodiment of a tandem valve type throttle body in accordance with the present invention.

A description will be given of a first embodiment of a tandem valve type throttle body in accordance with the present invention with reference to FIG. 2. Reference symbol A denotes a motor actuator, which is provided with a gear portion G and a motor M in an inner portion, and in which a rotation of the motor M is decelerated by the gear portion G so as to be output. Reference numeral 2 denotes a gear case in which a gear accommodating concave portion 2b is open toward a right open end 2a. The gear portion G is arranged within the gear accommodating concave portion 2b. The gear portion G is constituted by a motor gear G1 connected to an output shaft Ma of the motor M, an intermediate gear G2 and an output gear G3, from an upper side of the gear portion G toward a lower side. The intermediate gear G2 among them is structured such that a large-diameter gear G21 and a small-diameter gear G22 are formed in parallel in two stages along a longitudinal direction X-X of the support shaft 3 and a small-diameter gear G22 is arranged in the open end 2a side of the gear case 2. Further, a connection hole G3a formed in a D-shaped cross section for inserting an auxiliary throttle valve shaft mentioned below toward a side portion is provided in the output gear G3. In this case, reference symbol 5a denotes a first mounting boss provided near the open end 2a of the gear case 2, and a first mounting hole 4a is provided through in the first mounting boss 5a toward the open end 2a.

Reference numeral 1 denotes a motor case in which a motor accommodating concave portion 1b is open toward an open end 1a. A throttle body insertion hole 1d is provided through in a lower side of the motor case 1 from the open end 1a of the motor case 1 toward an opposite side surface 1c (a right side in FIG. 2) so as to face to the output gear G3. Further, the motor M is arranged so as to be inserted into the motor accommodating concave portion 1b of the motor case 1 mentioned above. Under the state mentioned above, the open end 2a of the gear case 2 and the open end 1a of the motor case 1 are brought into contact with each other, and the motor actuator A is formed. Further, the left side surface Mb in FIG. 2 of the motor M protrudes into the left gear accommodating concave portion 2b from the open end 1a of the motor case 1, and the left side surface Mb is arranged near the side surface G21a (corresponding to a right side surface of the large-diameter gear in FIG. 2) in the open end side of the large-diameter gear G21. Further, the throttle body insertion hole 1d of the motor case 1 is arranged so as to face to the output gear G3. (At least the throttle body insertion hole 1d faces to the connection hole G3a of the output gear G3.) In this case, reference symbol 5b denotes a second mounting boss provided near the open end 1a of the motor case 1. A second mounting hole 4b is provided through in the second mounting boss 5b toward the open end 1a. In the motor actuator A, the mounting boss 5 is formed by the first mounting boss 5a and the second mounting boss 5b, and a coaxial mounting hole 4 is formed by a first mounting hole 4a and a second mounting hole 4b.

Reference numeral 6 denotes a throttle body having an intake passage 7 provided through in an inner portion thereof. The intake passage 7 is mechanically controlled by a main throttle valve (not shown) so as to be opened and closed. An auxiliary throttle valve 8 is arranged in an intake passage 7a in an upstream side from the main throttle valve (corresponding to an air cleaner side close to an ambient air), and an opening of the upstream side intake passage 7a is controlled. The auxiliary throttle valve 8 is attached to an auxiliary throttle valve shaft 9 rotatably supported to the throttle body 6 across the intake passage 7a, and a left end of the auxiliary throttle valve shaft 9 is positioned in an inner side of the actuator support boss 6a corresponding to a bearing boss formed in the throttle body 6.

Further, the motor actuator mentioned above is attached to the throttle body 6 in accordance with the following manner. An outer periphery of the actuator support boss 6a of the throttle body 6 is inserted and supported to the throttle body insertion hole 1d provided in the motor case 1 of the motor actuator A, and the protruding end portion 9a having the D-shaped cross section formed in the left end of the auxiliary throttle valve shaft 9 protruding to the left side from the left end surface 6a1 of the actuator support boss 6a is inserted into the connection hole G3a of the output gear G3 so as to be connected. Further, the mounting boss 5 constituted by the first mounting boss 5a and the second mounting boss 5b is formed in the lower end in the drawing of the motor actuator A, the bolt T is inserted into the mounting hole 4 formed by the first mounting hole 4a and the second mounting hole 4b, and the motor actuator A is fixed by screw to the left side end of the throttle body 6 by screwing the bolt T toward the throttle body 6. In accordance with the tandem valve type throttle body mentioned above, the rotation of the motor M is decelerated by the motor gear G1, the intermediate gear G2 and the output gear G3, and the rotation decelerated of the output gear G3 is transmitted to the protruding end portion 9a of the auxiliary throttle valve shaft 9 from the connection hole G3a, whereby the auxiliary throttle valve 8 is controlled by the motor M so as to be opened and closed. In this case, in accordance with the intermediate gear mentioned above, since the intermediate gear G2 is structured such that the large-diameter gear G21 and the small-diameter gear G22 are formed in parallel in two stages along the longitudinal direction X-X of the support shaft 2, the rotation of the motor M is decelerated in the first stage by the motor gear G1 and the large-diameter gear G21, and is decelerated in the second stage by the small-diameter gear G22 and the output gear G3. In accordance with the structure mentioned above, since the rotation of the motor gear G1 is decelerated in two stages and the rotation of the auxiliary throttle valve shaft 9 is controlled via the output gear G3, it is possible to largely improve the rotation controllability of the auxiliary throttle valve 8. Further, in accordance with the structure mentioned above, since the small-diameter gear G22 and the large-diameter gear G21 of the intermediate gear are formed in parallel in two stages along the longitudinal direction X-X of the support shaft 3 at a time of the two-stage deceleration of the motor mentioned above, it is possible to make the distance B between the center of the motor M and the center of the output gear G3 to be small. Accordingly, it is possible to reduce the bending moment applied to the throttle body insertion hole 1d of the motor case 1 by the motor M, and the structure is preferably employed for a two-wheeled vehicle having a severe vibrating condition.

Further, the left side surface Mb of the motor M arranged so as to be accommodated within the motor case 1 protrudes into the left gear accommodating concave portion 2b from the open end 1a of the motor case 1 and is arranged near the side surface G21a in the open end side of the large-diameter gear G21. In accordance with the structure mentioned above, it is possible to make the center of gravity of the motor M arranged within the motor case 1 close to the open end 1a side of the motor case 1, it is possible to largely reduce the bending moment applied to the throttle body insertion hole 1d by the motor M at a time of fixing the throttle body insertion hole 1d open to the open end 1a of the motor case 1 to the actuator support boss 6a of the throttle body 6, and it is possible to very easily set the thickness of the throttle body insertion hole 1d portion and the length of the bearing. Further, in accordance with the structure mentioned above, since the gear case 2 is arranged in an outer side (a direction away from the throttle body 6) on the basis of the contact surface between the open end 2a of the gear case 2 and the open end 1a of the motor case 1, and the motor case 1 is arranged in an inner side (the throttle body 6 side), it is possible to arrange the motor M having a great constitution with respect to the gear portion G within a surface of projection of the throttle body 6, whereby it is possible to arrange the entire width W including the motor actuator A of the throttle body 6 in the longitudinal axial direction of the auxiliary throttle valve shaft 9 to be small.

As mentioned above, in accordance with the tandem valve type throttle body on the basis of the present invention, the rotation of the motor is decelerated in two stages and it is possible to greatly improve the rotation controllability of the auxiliary throttle valve 8. Further, it is possible to make the distance B between the center of the motor M and the center of the output gear G3 small, and it is possible to make the center of gravity of the motor M close to the open end 1a side of the motor case 1, whereby it is possible to greatly reduce the bending moment applied to the throttle body insertion hole 1d of the motor case 1, and the structure is preferably employed as the tandem valve type throttle body mounted on a two-wheeled vehicle particularly having the severe vibration condition. Further, since the motor M having the great constitution is arranged within the surface of projection of the throttle body 6 in the throttle body 6 side from the contact portions in both the open ends, it is possible to make the entire width W including the motor actuator A of the throttle body 6 small, and it is possible to improve the mounting property particularly to a two-wheeled vehicle in which the accommodating space is limited to the narrow range.

Embodiment 3

Figure 3:
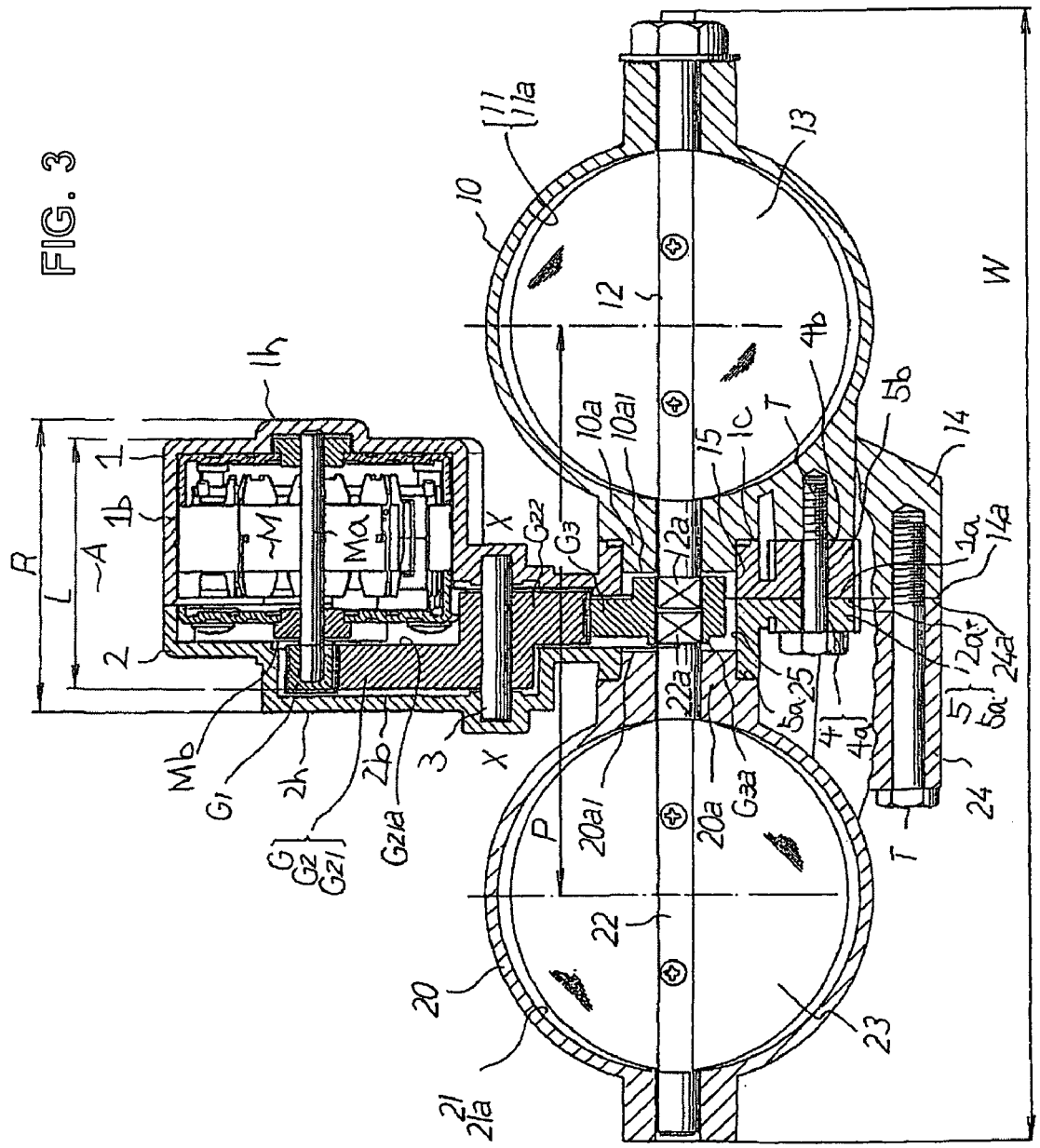
FIG. 3 is a vertical sectional view showing a second embodiment of the tandem valve type throttle body in accordance with the present invention.
Figure 4:
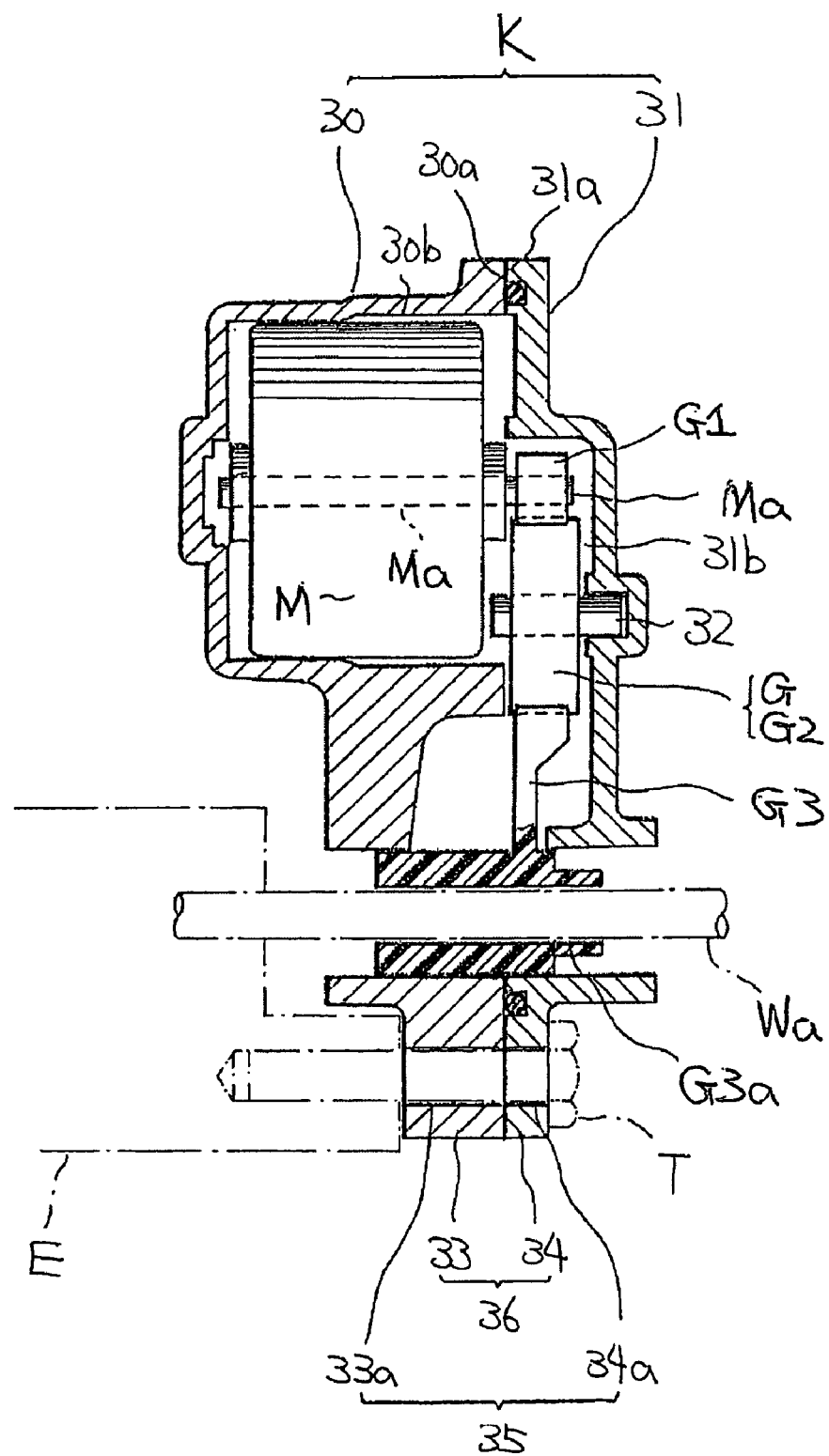
FIG. 4 is a vertical sectional view of a main portion showing a first example of a conventional motor actuator.
Figure 5:
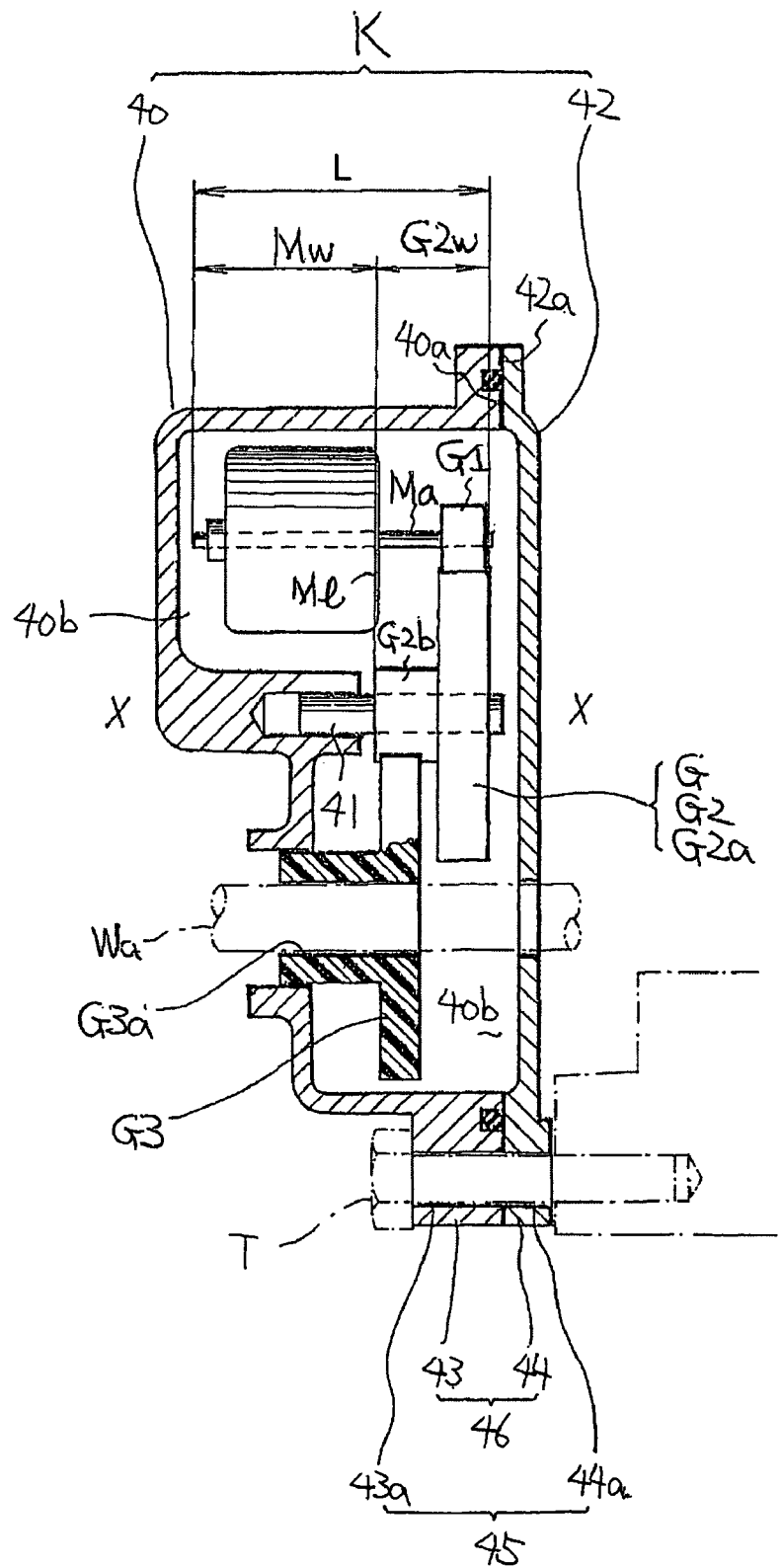
FIG. 5 is a vertical sectional view of a main portion showing a second example of the conventional motor actuator.

A description will be given of a second embodiment of the tandem valve type throttle body in accordance with the present invention with reference to FIG. 3. The present embodiment is constituted by a multiple throttle body in which a plurality of throttle bodies are arranged in a side portion. A description will be given only of different portions from FIG. 2, and a description of the same structure portions will be omitted by using the same reference numerals. A plurality of throttle bodies are arranged adjacently in the side portions. In the present embodiment, one side throttle body 10 is arranged in a right side in FIG. 3, and the other side throttle body 20 is arranged in a left side. A one side auxiliary throttle valve shaft 12 is arranged so as to be borne rotatably to and across an intake passage 11a in an upstream side from the main throttle valve in an intake passage 11 of the one side throttle body 10, and a one side auxiliary throttle valve 13 is attached to the one side auxiliary throttle valve shaft 12 so as to open and close the intake passage 11a. In this case, a left end of the one side auxiliary throttle valve shaft 12 is arranged so as to protrude further toward a left side from a left end 10a1 of a first actuator support boss 10a serving as a bearing boss formed in a left side wall of the one side throttle body 10, and a first protruding end portion 12a having a D-shaped cross section is formed in the protruding left end. The other side throttle body 20 is arranged in a left side of the one side throttle body 10, the other side auxiliary throttle valve shaft 22 is arranged so as to be borne rotatably to and across an intake passage 21a in an upstream side from the main throttle valve in an intake passage 21, and the other side auxiliary throttle valve 23 is attached to the other side auxiliary throttle valve shaft 22 so as to open and close the intake passage 21a. Further, a right end of the other side auxiliary throttle valve shaft 22 is arranged so as to protrude further toward a right side from a right end 20a1 of a second actuator support boss 20a serving as a bearing boss formed in a right side wall of the other side throttle body 20, and a second protruding end portion 22a having a D-shaped cross section is formed in the protruding right end. Further, the one side throttle body and the other side throttle body 20 are arranged so as to be adjacent to each other, and the longitudinal axial lines of the one side and the other side auxiliary throttle valve shafts 12 and 22 are coaxially arranged. In other words, there are arranged the left end surface 10a1 of the first actuator support boss 10a in the one side throttle body 10 and the right end surface 20a1 of the second actuator support boss 20a in the other side throttle body 20 so as to face to each other. In this case, reference numeral 14 denotes a first mounting boss formed so as to protrude toward a left side from the one side throttle body 10, and reference numeral 24 denotes a second mounting boss formed so as to protrude toward a right side from the other side throttle body 20.

Next, a description will be given of the motor actuator A. The motor actuator A mentioned above is different from the motor actuator shown in FIG. 2 only in the following portions, and the other structures are the same. A description will be given only of the different portions. A first throttle body insertion hole 15 is provided through in the lower side of the motor case 1 toward an opposite side surface 1*c* (a right side in FIG. 3) from the open end 1*a* of the motor case 1 so as to face to the right side surface of the output gear G3. Further, a second throttle body insertion hole 25 is provided through in the lower side of the gear case 2 toward an opposite side surface 5*a* (a left side in FIG. 3) from the open end 2*a* of the gear case 2 so as to face to the left side surface of the output gear G3. The first throttle body insertion hole 15 and the second throttle body insertion hole 25 are coaxially provided.

Further, the motor actuator A mentioned above is arranged between the adjacent facing surfaces of the one side throttle body 10 and the other side throttle body 20, and is attached in accordance with the following manner. An outer periphery of the first actuator support boss 10*a* of the one side throttle body 10 is inserted to the first throttle body insertion hole 15 provided in the motor case 1 of the motor actuator A so as to be supported, and the first protruding end portion 12*a* having the D-shaped cross section is inserted into the connection hole G3*a* of the output gear G3 from the right side so as to be connected at this time. The first protruding end portion 12*a* is formed in the left end of the one side auxiliary throttle valve shaft 12 protruding to the left side from the left end surface 10*a*1 of the first actuator support boss 10*a*. On the other hand, an outer periphery of the second actuator support boss 20*a* of the other side throttle body 20 is inserted to the second throttle body insertion hole 25 provided in the gear case 2 of the motor actuator A so as to be supported, and the second protruding end portion 22*a* having the D-shaped cross section is inserted into the connection hole G3*a* of the output gear G3 from the left side so as to be connected at this time. The second protruding end portion 22*a* is formed in the right end of the other side auxiliary throttle valve shaft 22 protruding to the right side of the right end surface 20*a*1 of the second actuator support boss 20*a*. Further, the bolt T is inserted into the mounting hole 4 constituted by the first mounting hole 4*a* and the second mounting hole 4*b* in the inner side of the mounting boss 5 constituted by the first mounting boss 5*a* and the second mounting boss 5*b* formed in the lower end in the drawing of the motor actuator A, and the motor actuator A is fixed by screw to the left side end of the one side throttle body 10 by screwing the bolt T toward the one side throttle body 10. Further, a right end surface 24*a* of the second mounting boss 24 in the other side throttle body 22 is brought into contact with a left end surface 14*a* of the first mounting boss 14 in the one side throttle body 10, the bolt T is inserted into the first mounting boss 14 via the second mounting boss 24 under the state mentioned above, the one side throttle body 10 and the other side throttle body 20 are adjacently arranged so as to be fixed by screwing the bolt toward the first mounting boss 14 in the one side throttle body 10, and the motor actuator A is fixedly arranged between the adjacent facing surfaces of the one side throttle body 10 and the other side throttle body 20.

In accordance with the structure mentioned above, the rotation of the motor M is decelerated by the motor gear G1, the intermediate gear G2 and the output gear G3, and the decelerated rotation of the output gear G3 is transmitted to the first protruding end portion 12*a* in the one side auxiliary throttle valve shaft 12 from the connection hole G3*a*, whereby the one side auxiliary throttle valve 13 in the one side throttle body 10 is controlled by the motor M so as to be opened and closed. On the other hand, the decelerated rotation of the output gear G3 is simultaneously transmitted to the second protruding end portion 22*a* in the other side auxiliary throttle valve shaft 22 by the connection hole G3*a*, whereby the other side auxiliary throttle valve 23 in the other side throttle body 20 is controlled by the motor M so as to be opened and closed in synchronous with the one side auxiliary throttle valve 13.

As mentioned above, in the tandem valve type throttle body in which the one side throttle body 10 and the other side throttle body 20 are arranged adjacently in the sideward direction, and the motor actuator is arranged between the facing side surfaces the thereof, the rotation of the motor M is decelerated in two stages so as to improve the rotation controllability of the auxiliary throttle valves, in the same manner as the first embodiment mentioned above. Further, it is possible to make the distance B between the center of the motor M and the center of the output gear G3 small and it is possible to make the center of gravity of the motor M close to the open end 1*a* side of the motor case 1, whereby it is possible to greatly reduce the bending moment applied to the first throttle body insertion hole 15 of the motor case 1 and the second throttle body insertion hole 25 of the gear case 2 by the motor, and it is possible to achieve the same effects as those of the first embodiment mentioned above.

Further, in accordance with the second embodiment, it is possible to further achieve the following effects. Since the left side surface Mb of the motor M arranged within the motor case 1 is protruded within the gear case 2 from the open end 1*a* of the motor case 1 and is arranged close to the side surface G21*a* in the open end side of the large-diameter gear G21 of the intermediate gear G2, it is possible to make the right side surface 1*h* of the motor case 1 close to the left side in FIG. 3 at that degree. Further, even in the case of employing the intermediate gear G2 in which the large-diameter gear G21 and the small-diameter gear G22 are arranged in two stages in parallel, it is possible to determine the length L in the longitudinal direction of the output shaft Ma between the motor M and the gear portion G to be short without being affected at all by the gear width of the small-diameter gear G22. In accordance with the structure mentioned above, it is possible to lessen a distance R between a left side surface 2*h* of the gear case 2 and a right side surface 1*h* of the motor case 1, and it is possible to shorten a distance from the open end 1*a* of the motor case 1 to the right side surface 1*h* of the motor case 1. Particularly, in the case that the motor actuator A mentioned above is arranged between the facing surfaces of the adjacent throttle bodies 10 and 20, it is possible to effectively shorten a pitch P between both the throttle bodies 10 and 20, and it is possible to shorten an entire width W of the throttle bodies in the longitudinal axial direction of the auxiliary throttle valve shafts of the tandem valve type multiple throttle body, whereby it is possible to greatly improve a freedom of mounting it to a narrow accommodating space, particularly such as a two-wheeled vehicle.

Further, since the motor case 1 is inserted to the first actuator support boss 10*a* in the one side throttle body 10 via the first throttle body insertion hole 15 so as to be supported, and the gear case 2 is inserted to the second actuator support boss 20*a* in the other side throttle body 20 via the second throttle body insertion hole 25 so as to be supported, it is possible to more firmly support the motor actuator A between both the throttle bodies 10 and 20. Further, in addition to the structure mentioned above, since the motor actuator A is screwed to the throttle bodies via the mounting hole 4 provided within the mounting boss 5 by the bolt T, it is possible to more stably and securely attach the motor actuator A to the throttle bodies. Accordingly, it is preferably employed particularly for a juddering two-wheeled vehicle.

Further, since the output gear G3 directly applies the rotating force to the one side auxiliary throttle valve shaft 12 and the other side auxiliary throttle valve shaft 22, it is possible to further synchronously and securely control the rotation of both the auxiliary throttle valve shafts. Even in the case that the one side auxiliary throttle valve shaft and the other side auxiliary throttle valve shaft are formed as one shaft, and the intermediate portion thereof is connected to the connection hole G3*a* of the output gear G3, it is possible to apply the rotating force from the output gear G3 toward the right and the left and it is possible to achieve the same effect as mentioned above. Further, in the present embodiment, two throttle bodies are arranged in the side direction, however, the number of the throttle bodies is not limited, but the present embodiment can be applied to three train and four train throttle bodies.

What is claimed is:

1. A motor actuator structured such that a motor and a gear portion are arranged so as to be accommodated within an actuator case formed by a motor case and a gear case, and a rotation of the motor is decelerated by the gear portion and is output toward an external portion via an output gear, wherein a gear accommodating concave portion is provided in a concave manner from an open end at a right side toward a bottom portion in the gear case, the gear portion arranged within the gear accommodating concave portion is formed by a motor gear connected to an output shaft of the motor, an intermediate gears, which is connected to a support shaft and has the structure that a small-diameter gear and a large-diameter gear are formed in two stages along a longitudinal direction of the support shaft in parallel, the small-diameter gear is arranged at the open end side of the gear case and the large-diameter gear is arranged at the bottom portion side of the gear accommodating concave portion, and an output gear outputting the rotation toward the external portion, a motor accommodating concave portion provided in a concave manner toward a left side open end in the motor case, which is arranged so as to be brought into contact with the open end of said gear case, a left side surface of the motor arranged within the motor accommodating concave portion of the motor case is arranged so as to protrude to an inner side of the gear accommodating concave portion of the gear case from the open end of the motor case and be close to a side surface of an open end side of the large-diameter gear within the gear accommodating portion, and a mounting boss having a mounting hole is provided continuously with the open end of the gear case and a mounting boss having a mounting hole is provided continuously with the open end of the motor case.

* * * * *